Jan. 28, 1958 W. M. CHALMERS 2,821,409
FIFTH WHEEL SUSPENSION
Filed March 26, 1957 3 Sheets-Sheet 1

INVENTOR.
WILLIAM M. CHALMERS
BY
RICHEY, WATTS, EDGERTON,
MCNENNY & FARRINGTON
ATTORNEYS

Jan. 28, 1958  W. M. CHALMERS  2,821,409
FIFTH WHEEL SUSPENSION
Filed March 26, 1957  3 Sheets-Sheet 2

INVENTOR.
WILLIAM M. CHALMERS
BY
RICHEY, WATTS, EDGERTON,
McNENNY & FARRINGTON
ATTORNEYS

Jan. 28, 1958  W. M. CHALMERS  2,821,409
FIFTH WHEEL SUSPENSION
Filed March 26, 1957  3 Sheets-Sheet 3
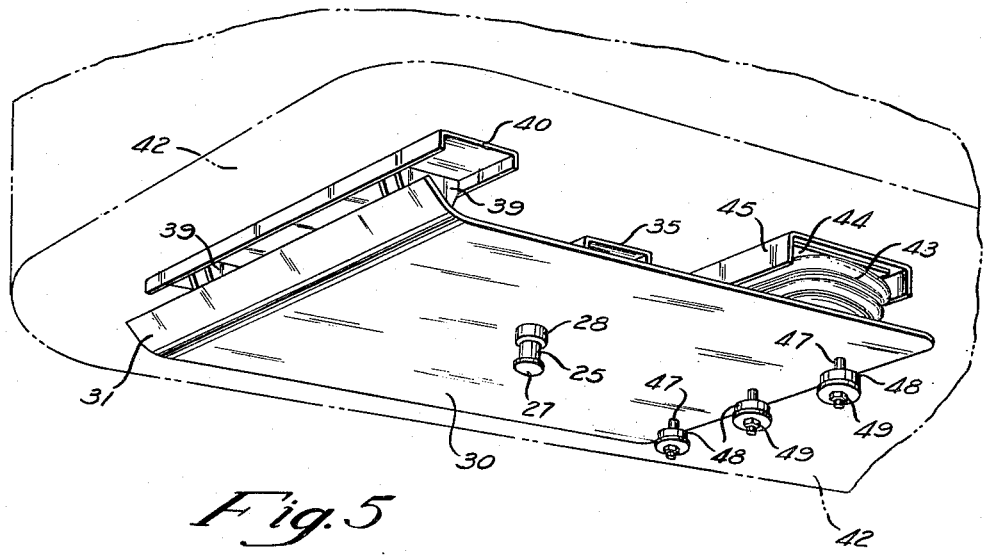
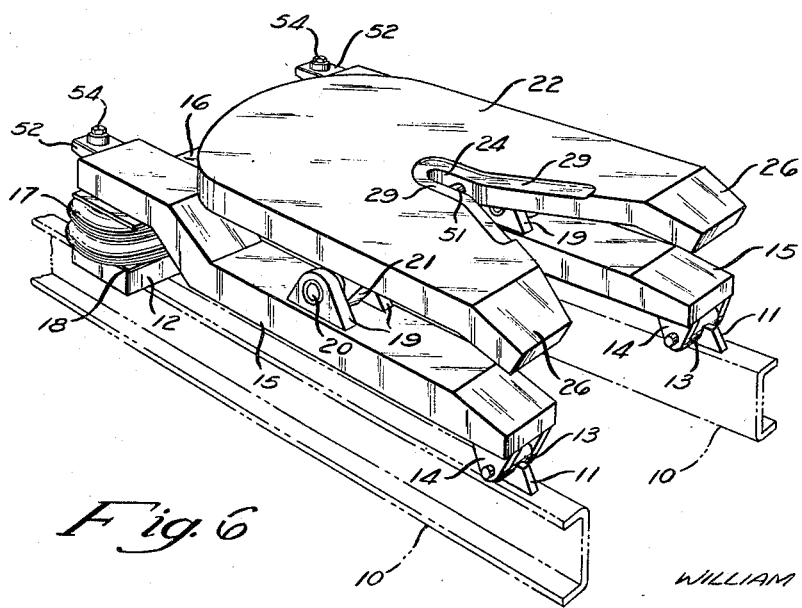
INVENTOR.
WILLIAM M. CHALMERS
BY
RICHEY, WATTS, EDGERTON,
McNENNY & FARRINGTON
ATTORNEYS

United States Patent Office 2,821,409
Patented Jan. 28, 1958

2,821,409
FIFTH WHEEL SUSPENSION
William M. Chalmers, Niles, Ohio, assignor to Youngstown Steel Car Corporation, Niles, Ohio, a corporation of Ohio
Application March 26, 1957, Serial No. 648,554
7 Claims. (Cl. 280—440)

This invention relates broadly to motor vehicles and more specifically to improvements in the connections between a tractor and a semi-trailer.

One of the objects of the invention is to provide an air cell for the support of the fifth wheel on a tractor, and a second air cell for the support of the companion plate on the trailer, the assembly being designed to dampen the road shocks and vibrations transmitted from the tractor to the semi-trailer.

Another object of the invention is to provide a fifth wheel and companion plate hinged for movement in a vertical plane and restrained from movement in a horizontal plane.

Another object of the invention is to provide snubbers for the companion plate of the assembly to delimit the rebound thereof.

Further objects of the invention reside in the provision of a structure which is economic of manufacture, efficient of operation, sturdy of structure and suceptible of assembly on vehicles now in use without modification of the tractor chassis on semi-trailer body framing.

Other objects and advantages more or less ancillary to the foregoing, and the manner in which all the various objects are realized, will appear in the following description, which considered in connection with the accompanying drawings, sets forth the preferred embodiment of the invention.

In the drawings:

Fig. 5 is a view in perspective of the lower face of the trailer, air cell supporting plate and king pin; and Fig. 6 is a perspective view of the upper face of the tractor air cell supporting plate.

Figure 1:
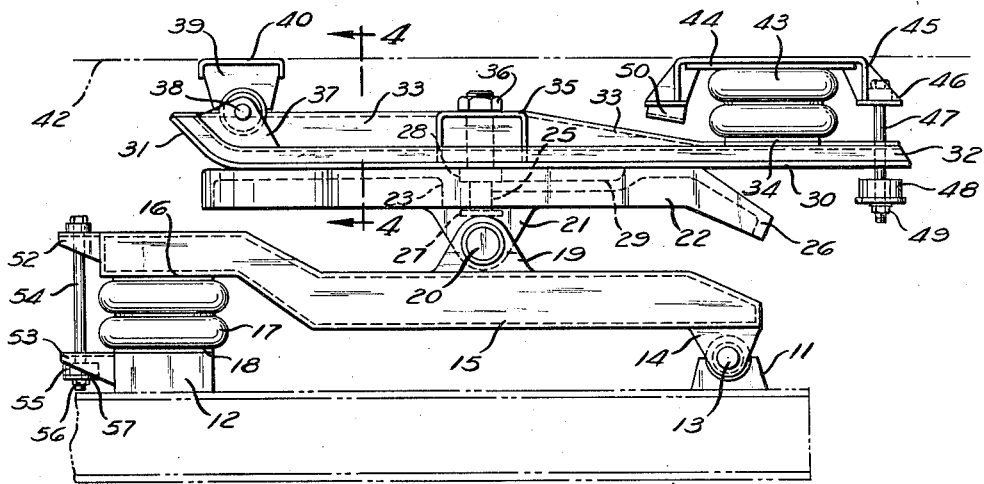
Fig. 1 is a side elevational view of the improved fifth wheel assembly.
Figure 2:
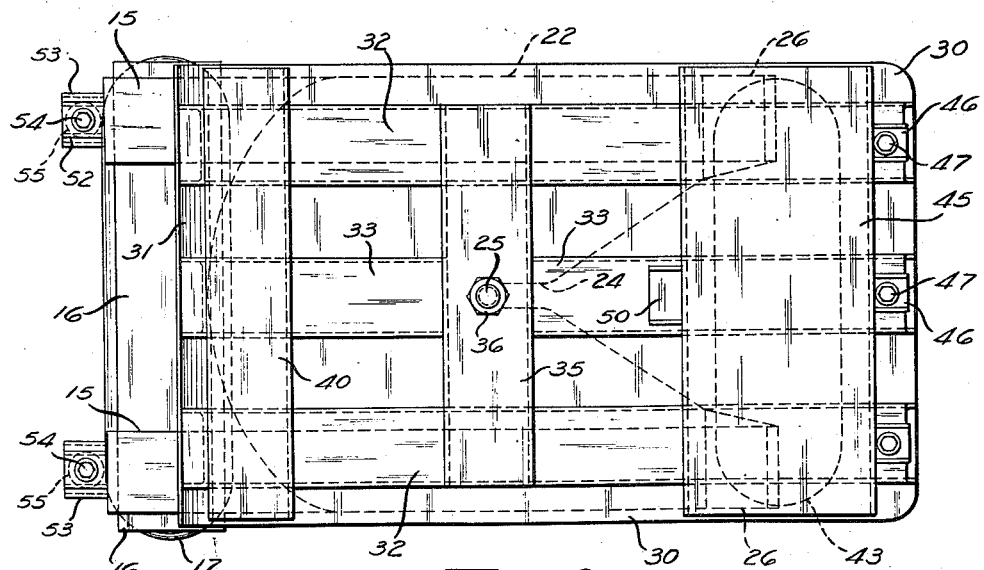
Fig. 2 is a plan view thereof.
Figure 3:
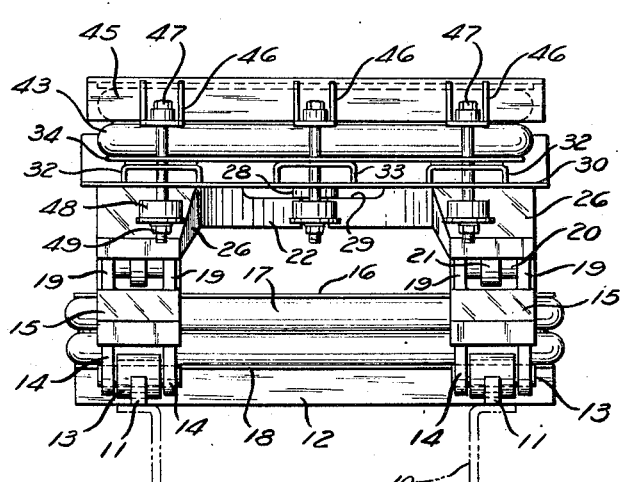
Fig. 3 is an end elevational view of the structure shown in Fig. 1.
Figure 4:
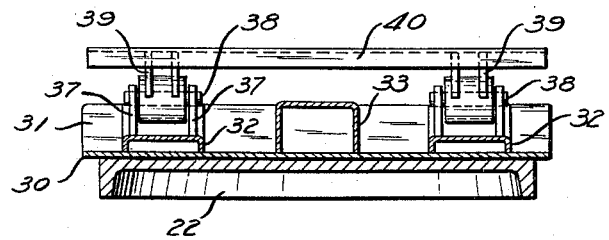
Fig. 4 is a vertical section through the upper plate of the fifth wheel assembly, the section being taken on a plane indicated by the line 4—4 in Fig. 1.

Referring first to Fig. 1, the tractor frame comprises a pair of parallel channels 10 having vertical brackets 11 on the rearward end thereof and a cross member 12 adjacent the inner end of the frame. The brackets 11 are machined to receive rubber clad pins 13 for the pivotal support of lugs 14 depending from a plate 15. The forward end of the plate 15 is directed upwardly and the lower face thereof has a plate 16 thereon which is attached to an air cell 17. The cross member 12 is also provided with a flanged plate 18 having the lower face of the air cell vulcanized thereto. The central portion of the plate 15 is provided with a pair of spaced brackets 19 having vertical ears therein which retain pins 20 pivotally engaged with lugs 21 on the lower fifth wheel plate 22. The central portion of the plate is formed with a boss 23 (Fig. 1) having a slot 24 therein to receive a king pin 25. The slot tapers rearwardly to the end of the plate and the free ends of the arms 26 defined thereby are inclined downwardly at an angle of about thirty degrees (30°) (Fig. 6). The king pin is formed with a diametrically enlarged end 27 and an enlarged central body 28 which are engaged respectively with the bottom faces of the boss and a ledge 29 formed in the plate contiguous the slot 24. The upper half of the fifth wheel unit comprises a rectangular plate 30 with an upwardly directed forward edge 31 and a plurality of longitudinal pressed steel ribs 32 of channel form welded thereon. The central lineal rib 33 is higher at its forward end, and the rearward portion thereof is tapered downwardly and terminates intermediate the center of the plate and the rearward end thereof. The outer ribs 32 support an air cell plate 34 rearward the ends of the center rib 32. The plate 30 is further provided with a channeled cross rib 35 of a height equal to that of the medial rib 33, and the center of the rib is drilled to receive the threaded upper end of the king pin and a nut 36 which is seated on the upper face of the web of the channel. The forward ends of the ribs 32 are provided with vertical ears 37 which are drilled to retain rubber clad pins 38 mounted therein and in lugs 39 depending from a channel iron 40 bolted to the lower face of the semi-trailer floor plate 42 (Fig. 5). The plate 34 is vulcanized to an air cell 43 which in turn, is vulcanized to an opposed top plate 44. The plate is retained by channel irons 45 bolted to the lower face of the floor 42 of the semi-trailer. The channel irons 45 have a plurality of brackets 46 welded to the rearward face thereof which are drilled to retain bolts 47 protruding through openings in the end portions of the ribs 32 and 33 and the plate 30. The bolts are provided with rubber blocks 48 adjacent the lower face of the plate 30 retained by washers and nuts 49. The bolt assembly constitutes a snubber to delimit the rebound movement of the plate 30 and parts attached thereto.

A bumper plate 50 is welded to the lower face of the channel 45 to arrest the depression of the air cell 43 or upward movement of the trailer plate 30, and a keeper 51 (Fig. 6) is provided on the fifth wheel 22 adjacent the reduced end portion of the king pin to lock the semi-trailer to the tractor.

The ends of the plate 15, and the inner face of the cross member 12, are provided with brackets 52 and 53 apertured to receive bolts 54 having rubber blocks 55 on the lower ends thereof engageable with the lower faces of the brackets 53. The bolts are retained in place by nuts and washers 56 and 57 on the ends thereof and constitute snubbers to arrest axcessive rebound movement of the plate 15.

In certain installations, it may be necessary or desirable to eliminate the rearward air cell 43 and plate 30 therefor and mount the fifth wheel mating plate of the trailer on the plate 22. In such construction, the over-all height of the semi-trailer may be lowered without material sacrifice to the advantages of the air cushion.

From the foregoing, it will be seen that the semi-trailer is free to move vertically responsive the deflection of the air cells 17 and 43, yet transverse movement thereof is restraining the hinge in connections 13 and 38 and the snubbers 48.

Although the foregoing description is necessarily of a detailed character, in order that the invention may be completely set forth, it is to be understood that the specific terminology is not intended to be restrictive or confining, and that various rearrangements of parts and modifications of detail may be resorted to without departing from the scope or spirit of the invention as herein claimed.

What is claimed is:

1. An air cushion supporting structure for a semi-trailer upon a tractor comprising a tractor frame, a cross member on said frame adjacent the forward end thereof, a plate hinged for vertical swinging movement on the rearward end of said frame, a hinge between said plate and said frame the axis thereof being horizontal and transverse said frame, an air cell intermediate said plate and said cross member, a fifth wheel member pivoted adjacent the center thereof for vertical swinging movement relative to said plate, a hinge between said plate and said fifth wheel member, the axis thereof being horizontal and transverse the major axis of the plate, a second fifth wheel member on said first fifth wheel member hinged for vertical swinging on the forward end thereof, a hinge between said first and second fifth wheel members, the axis thereof being horizontal and transverse the major axis of said fifth wheel members, a second air cell supported on the rear end of the second fifth wheel member, and a king pin in the second fifth wheel member supported for horizontal pivotal movement of the second fifth wheel member on the first named fifth wheel member.

2. An air cushion supporting structure for a semitrailer upon a tractor comprising a tractor frame, a trailer floor above and parallel thereto, a cross member on said frame adjacent the forward end thereof, a plate hinged for vertical swinging movement on the rearward end of said frame, a hinge between said plate and said frame, the axis thereof being horizontal and transverse said frame, an air cell intermediate said plate and said cross member, a lower fifth wheel member pivoted adjacent the center thereof for vertical swinging movement on said plate, a hinge between said plate and said fifth wheel member, the axis thereof being horizontal and transverse the major axis of said plate, an upper fifth wheel member engaged with said lower fifth wheel member hinged adjacent the forward end thereof for vertical swinging movement relative to said trailer floor, a hinge between said upper fifth wheel member and said trailer floor, the axis thereof being horizontal and transverse the major axis of said upper fifth wheel member, a second air cell engaged with the rearward end of said upper fifth wheel plate, a king pin in the upper fifth wheel member supported for pivotal horizontal movement in said lower fifth wheel member, a fixed plate on said trailer floor for the retention of the second named air cell, and buffers on said fixed plate connected with said upper fifth wheel member.

3. An air cushion support for a semi-trailer upon a tractor comprising a tractor frame, a superjacent trailer floor member, a cross member on said frame, a plate hinged for vertical swinging movement on said frame, an air cell intermediate said plate and said cross member, a hinge between said plate and said frame, the axis thereof being horizontal and transverse said frame, a lower fifth wheel member pivoted for vertical swinging movement on said plate, a hinge between said lower fifth wheel member and said plate, the axis thereof being horizontal and transverse the major axis of the plate, an upper fifth wheel member on said lower fifth wheel member pivoted for vertical swinging movement, a hinge between said upper fifth wheel member and said trailer floor, the axis thereof being horizontal and transverse the major axis of said second fifth wheel member, a second air cell on said upper fifth wheel member, a king pin in said upper fifth wheel member connected to said lower fifth wheel member, a second air cell disposed between said trailer floor member and said upper fifth wheel member, and snubbers between said second fifth wheel member and said floor members to delimit vertical flexure of said second named air cell.

4. An air cushion support for a semi-trailer upon a tractor comprising a tractor frame, a trailer floor member, a cross member on said frame, a plate on said frame, a hinge between said plate and said frame the axis thereof being horizontal and transverse said frame, an air cell intermediate said plate and said cross member, a fifth wheel member on said plate, a hinge between said fifth wheel member and said plate, the axis thereof being horizontal and transverse the major axis of said plate, a second fifth wheel member engaged with said first fifth wheel member, a hinge on the forward end thereof, the axis of said hinge being horizontal and transverse the major axis of said second fifth wheel member, a second air cell engaged with the rearward end thereof, a king pin in the second fifth wheel member for horizontal rotative movement of the second named fifth wheel member, a hinge on the lower face of said trailer floor member coupled with the forward end of the second fifth wheel member, the axis thereof being horizontal and transverse the major axis of the second wheel member, a fixed plate on said trailer floor member for the retention of said second air cell, and a stop on said fixed plate to delimit the vertical flexure of said second air cell.

5. An air cell mounting for a semi-trailer on a tractor comprising a trailer floor member, a tractor frame, a plate pivoted for vertical movement on one end thereof, a hinge between said plate and said frame, the axis thereof being horizontal and transverse said frame, an air cell on the opposed end thereof intermediate said frame and said plate, a lower fifth wheel member pivoted for vertical movement on said plate, a hinge between said plate and said lower fifth wheel member, the axis thereof being horizontal and transverse the major axis of the plate, an upper fifth wheel member on the lower fifth wheel member pivoted at one end thereof for vertical movement, a hinge between said upper fifth wheel member and said trailer floor member, the axis thereof being horizontal and transverse the major axis of said upper fifth wheel member, a second air cell on the opposed end of said upper fifth wheel, said air cell abutting the lower face of said trailer floor member, a king pin pivotally connecting the two fifth wheel members, means between the upper fifth wheel member and said tractor floor member to delimit the vertical flexure of said second named air cell, and means between said second named fifth wheel member and said floor member to delimit downward movement of said second named fifth wheel member.

6. An air cell mounting for a semi-trailer on a tractor comprising a tractor frame, a plate on one end thereof, a hinge between said plate and said frame, the axis thereof being horizontal and transverse said frame, an air cell on the opposed end thereof intermediate said frame and said plate, a lower fifth wheel member, a hinge between said lower fifth wheel member and said plate, the axis thereof being horizontal and transverse the major axis of said lower fifth wheel member, an upper fifth wheel member on the lower fifth wheel member, a hinge between said upper and lower fifth wheel members, the axis thereof being horizontal and transverse the major axis of said fifth wheel members, a second air cell on the opposed end thereof, said air cell abutting the lower face of the floor of the trailer body, a king pin connecting said two fifth wheel members for horizontal pivotal movement, said plate and said upper fifth wheel member embodying upstanding ears, and said floor member and said lower fifth wheel member embodying depending ears disposed respectively in straddled relation with each other to restrain lateral movement of the fifth wheel members.

7. An air cell mounting for a semi-trailer on a tractor comprising a tractor frame, a plate on one end thereof, a hinge on said plate, the axis thereof being horizontal and transverse said frame, an air cell on the opposed end thereof intermediate said frame and said plate, a lower fifth wheel member on said plate, a hinge on said plate the axis thereof being horizontal and transverse the major axis of said plate, an upper fifth wheel member on the lower fifth wheel member, a hinge on said upper fifth wheel member, the axis thereof being horizontal and transverse the major axis of said fifth wheel members, a second air cell on said upper fifth wheel member, and snubbers intermediate said plate and said frame.

References Cited in the file of this patent
UNITED STATES PATENTS

| | | |
|---|---|---|
| 2,391,372 | Weigand | Dec. 18, 1945 |
| 2,733,931 | Reid | Feb. 7, 1956 |